W. A. McGUIRE.
COFFEE GRINDER.
APPLICATION FILED JULY 5, 1911.
1,034,813.
Patented Aug. 6, 1912.
2 SHEETS—SHEET 1.
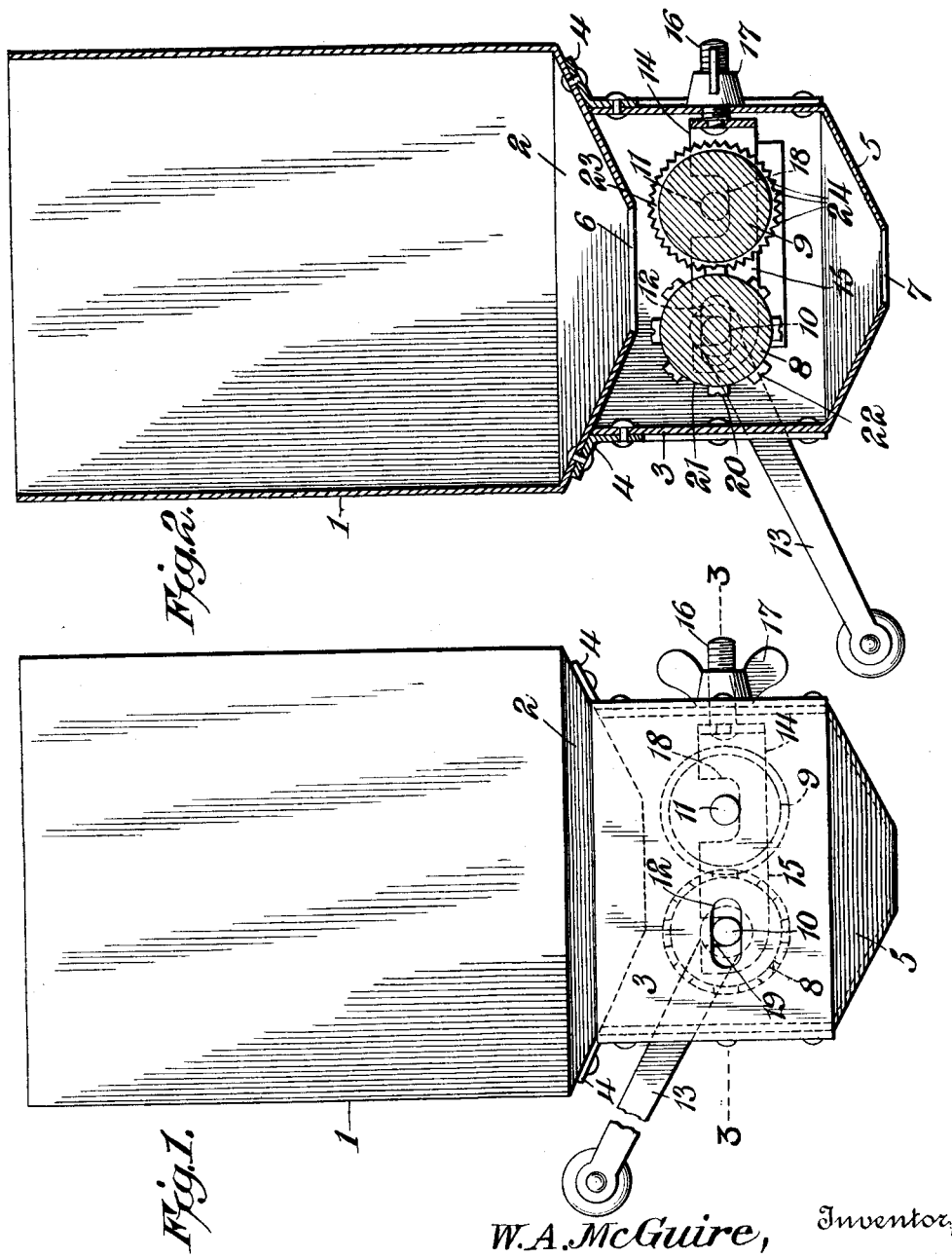
Witnesses
Howard D. Orr.
H. T. Chapman.
W. A. McGuire, Inventor,
By E. G. Siggers
Attorney W. A. McGUIRE.
COFFEE GRINDER.
APPLICATION FILED JULY 5, 1911.
1,034,813.
Patented Aug. 6, 1912.
2 SHEETS—SHEET 2.
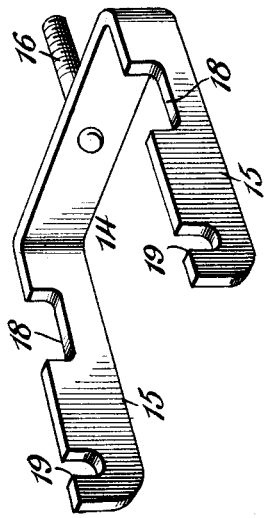
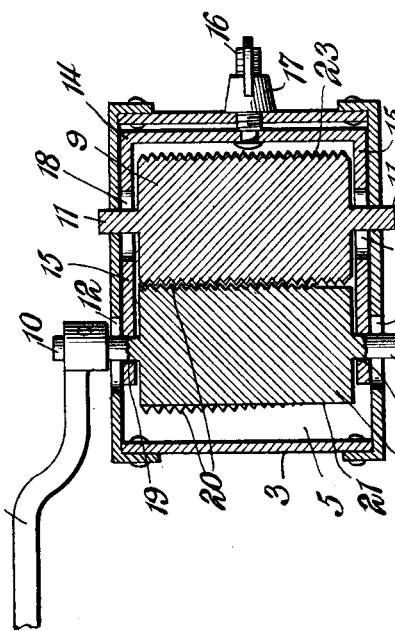
W. A. McGuire, Inventor,
Witnesses
Howard D. Orr.
F. T. Chapman.
By E. G. Siggers
Attorney

UNITED STATES PATENT OFFICE.

WILLIAM A. McGUIRE, OF TURTLE CREEK, PENNSYLVANIA.

COFFEE-GRINDER.

1,034,813.  Specification of Letters Patent.  Patented Aug. 6, 1912.

Application filed July 5, 1911. Serial No. 637,028.

*To all whom it may concern:*

Be it known that I, WILLIAM A. McGUIRE, a citizen of the United States, residing at Turtle Creek, in the county of Allegheny and State of Pennsylvania, have invented a new and useful Coffee-Grinder, of which the following is a specification.

This invention has reference to improvements in coffee grinders, although not necessarily limited to such specific use, and its object is to provide a grinder or mill capable of grinding coffee or the like more rapidly than mills of the more common type.

The invention comprises two grinding rolls, between which the coffee is fed, which rolls may be brought into suitable relation depending upon the desired fineness of the ground product, the axes of rotation of the two rolls being substantially parallel. One roll or grinder is provided with circumferential series of ridges, preferably of V-shape in parallel relation one to the other and having their outer edges formed into teeth, while the other roll or grinder is provided with like circumferential ridges, which, however, are not continuous peripherally, but are divided by a circular series of channels preferably equi-distantly spaced about the roll or grinder, and each of a depth about that of the circumferential grooves between the ridges and defining the latter. The first mentioned grooves extend in the general direction of the length of the axes of rotation of the roll or grinder in which they are formed, but are displaced so as to form a small angle to a respective radial axial plane of the roll or grinder, so that each groove defines a screw of long pitch making but a small fraction of a turn about the axis of rotation from one end of the roll to the other. The rolls or grinders are mounted in a suitable support, so that one roll or grinder may be adjusted toward or from the other roll or grinder with the circumferential ridges of one roll presented to the grooves between the ridges of the other roll, the ridges of the two rolls operating as coacting grinding or crushing members, whereby on the rotation of the grinders the coffee berries presented to these grinders are engaged by the respective ridges and broken and crushed to the desired fineness, the degree of fineness being determined by the closeness of approach of the rolls one toward the other.

The invention will be best understood from a consideration of the following detailed description, taken in connection with the accompanying drawings forming a part of this specification, with the understanding, however, that while the drawings show a practical form of the invention, the latter is not limited to such form, but is susceptible of various modifications and changes so long as such changes mark no material departure from the scope of the invention.

In the drawings:—Figure 1 is a side elevation of a coffee mill as viewed from the side remote from the handle. Fig. 2 is a central vertical section of the structure shown in Fig. 1 on a plane approximately midway of the length of the grinding rolls. Fig. 3 is a section on the line 3—3 of Fig. 1 with remoter parts omitted. Fig. 4 is a perspective view of an adjusting device for one of the grinding rollers. Fig. 5 is a plan view of the longitudinally grooved grinding roll. Fig. 6 is a similar view of the other grinding roll.

Referring to the drawings, there is shown a body member 1 designed to receive the coffee to be ground, and for convenience of description it will be assumed that the material to be ground is coffee without, however, limiting the use of the invention to such particular material. The body member 1 terminates in a hopper 2 and to this hopper there is secured a casing 3 by brackets 4 or in any other suitable manner, and this casing in turn terminates in a hopper 5. The hopper 2 has a discharge opening 6 and the hopper 5 has a discharge opening 7. The structures so far described are to be taken as more or less indicative of any suitable structures for the purposes of the invention, since these particular structures may be greatly modified without in any manner affecting the invention.

Lodged within the casing 3 are two rollers 8 and 9, respectively, each formed at the ends with axial pintles 10, 11, respectively. The pintles 10 extend through elongated slots 12 formed in the side walls of the casing 3, while the pintles 11 may be journaled directly in the casing 3, as indicated in Figs. 1 and 3. Because of the slots 12 the pintles 10 which extend into and if desired through these slots, may move along the slots in the direction of their length, whereby, the slots 12 being properly directed, the roll or grinder 8 may be moved toward and from the roll or grinder 9. Either of the rolls or grinders may have one of its pintles sufficiently extended to provide for the application of a driving means, and in the particular showing of the drawings one of the pintles 10 is so extended and receives a crank handle 13, whereby the roller 8 may be rotated at the will of an operator. In coffee grinders or mills of large capacity the handle 13 is replaced by other power applying means, such as are commonly used in connection with power grinders, but this forms no part of the present invention and is, therefore, not illustrated.

Within the casing 3 there is a frame 14 separately shown in Fig. 4, and this frame is in the particular construction shown of U-form with the legs 15 of the U parallel and the yoke of the U carrying a centrally located pin 16 projecting from the yoke in a direction opposite from the legs 15 and carried through the corresponding wall of the casing 3. This pin 16 is screw threaded and to it is applied a wing nut 17. The purpose of the stem 16 and wing nut 17 is to provide for the adjustment of the frame 14 for a purpose which will presently appear. The pintles 11 of the roll or grinder 9 extend through the legs 15 of the frame 14, these legs being provided with elongated notches or recesses 18 permitting movement of the frame in the direction of the length of the legs 15 without interference from engagement with the pintles 12, the notches 18 being sufficiently elongated to permit all the movement of the frame 14 desired without the ends of the recesses 18 engaging said pintles. Near the free ends the legs 15 have formed therein alined bearings 19, which bearings are shown as open at one side, and in these bearings the pintles 10 of the roll or grinder 8 rest, and these pintles also may engage the long walls of the slots 12, so that the frame 14 does not of necessity carry the roller 8 at all. When the thumb nut 17 is manipulated in the proper direction, the roller 8 is or may be moved away from the roller 9 and when the thumb nut 17 is manipulated in the other direction the roller 8 is caused to approach the roller 9, the latter being in fixed relation to the casing 3 other than its capability of rotating about its longitudinal axis, while the roller 8 is movable by the frame 14 with relation to the frame 3 to and from the roller 9.

In order that the coffee berries may be ground, the rollers are formed with grinding devices, one roller being differently formed from the other, the grinding devices being formed on rather than attached to the grinding rolls. The roller 8 has formed on its surface ridges or teeth 20 of V shape with the apexes of the V outward, and these ridges or teeth are arranged in series extending in the general direction of the longitudinal axis of the roller, while each longitudinal series of ridges or teeth is divided from the next longitudinal series of ridges or teeth by a groove 21 also generally longitudinal of the roller and of a depth about that of the height of the ridges or teeth. The teeth 20 of each series extend from one groove 21 to the other and the teeth of one series are in line with the corresponding teeth of all the other series entirely around the roller 8, so that the teeth form broken peripheral ridges about the roller, the breaks in the ridges being due to the grooves 21, which latter are substantially parallel one with the other, and, therefore, the longitudinal series of teeth 20 are also substantially parallel one with the other, the grooves 21 and the longitudinal series of teeth 20 being all of about the same width circumferentially, although this particular arrangement is not mandatory. Furthermore, the grooves 21 and the longitudinal series of teeth 20 intermediate of these grooves do not extend strictly in the direction of the longitudinal axis of the roller, but at a slight angle thereto, so that each groove and each longitudinal series of teeth has a twist approximately equivalent to its width, that is, one end of a series of teeth is about opposite the other end of the adjoining groove 21 in the line of the axis of the roller, each series of teeth therein having a pitch throughout the length of the series, which is equal to the length of the roller, approximately equal to the circumferential length of the individual teeth of the series. Furthermore, each tooth of each series is provided with an intermediate notch 22 of less depth than the height of the tooth.

The roller or grinder 9 is provided with circumferential ridges 23 of V-shape approximately agreeable in number and depth to the teeth 20 of a longitudinal series of teeth, and when the rollers are assembled the ridges of one grinder may seat in the grooves within the ridges of the other grinder. The ridges 23 are unbroken circumferentially except that in the outer edges of each there is formed a circumferential series of notches 24 sufficiently close to define short teeth of approximately pyramidal form and substantially continuous throughout the length of each ridge 23.

The roller or grinder 8 has its surface provided with a circular series of teeth elongated circumferentially and arranged closely adjacent in longitudinal series, the circumferentially disposed teeth being separated by grooves or spaces of about the same extent as the teeth circumferentially, and the longitudinal series of teeth, as well as the grooves have a helical pitch substantially the same as the length of an individual tooth, while each tooth has the continuity of its outer edge broken intermediately by a notch. A roller or grinder 9 has on its surface a longitudinal series of circumferential ridges, the outer edges of which are notched to constitute each a circular series of teeth of less radial extent than the ridges, while the ridges of the roller 9 are adapted to engage between the outer edges of the teeth of the roller 8, whereby the active surfaces of the two rollers may be brought into very close relation for fine grinding, or may be suitably separated for coarse grinding.

When coffee berries are introduced into the receptacle 1, they gravitate to the hopper 2 and from thence through the opening 6 to the rollers or grinders 8 and 9 and seek the point where these grinders meet or have their surfaces close together. Now, by turning the roller 8 by means of the handle 13, or by any other suitable means provided, the coffee berries will tend to move into the grooves 21, which because of their pitch are brought progressively throughout their length toward the corresponding portion of the roll 9, and those edges of the teeth 20 which may be called the forward edges because their ends are presented toward the direction of rotation, engage the berries and force them into contact with the teeth 24 of the ridges 23. The constantly approaching surfaces of the two rollers bring sufficient pressure to bear upon the coffee berries to crush the latter, and because of the brittle nature of such coffee berries they shatter into pieces, which in turn are caught by the teeth and broken up into smaller pieces until finally the pieces are small enough to pass through the spaces between the two rollers and finally reach the hopper 5 to pass therefrom through the opening 7 into a suitable receptacle. It will be observed that the ridges 23 are always presented in or opposite the grooves 21 and are always presented in traversing or operative relation to the spaces between the teeth 20, so that no particles of coffee can pass between the rollers or grinders without being acted upon unless these particles have reached the requisite fineness. The teeth 20 because of the spacing due to the grooves 21 act not only as crushing means together with the ridges 23, but the forward ends of these teeth operate as impelling means for the coffee forcing the berries or broken particles of the berries positively between the rollers without giving a chance for the particles to spring back. This is in part due to the fact that those ends of the teeth 20 which constitute the forward ends in the direction of rotation are substantially perpendicular to the surface of the roller as defined by the grooves 21 and, therefore, bite into the coffee berries or broken pieces thereof and urge the material between the rollers with the rapidity of rotation of the rollers.

Practical experience with the grinding rollers as compared with coffee grinders as ordinarily constructed has shown a marked increase in the speed of grinding, like quantities of coffee being ground by the rollers of the present invention in but a comparatively small fraction of time with respect to the time taken by the ordinary grinders. The actual speed of grinding shows that the grinders of the present invention will act upon a certain quantity of coffee in about one-sixth the time taken by grinders as ordinarily found on the market.

What is claimed is:—

1. In a coffee grinder, a pair of grinding rollers, one roller having circumferential continuous ridges each with its outer edge formed into a circular series of teeth of less depth than the height of the ridge, and the other roller being provided with circumferential discontinuous ridges each provided between the points of discontinuity with a plurality of teeth of less depth than the height of the ridge.

2. In a coffee grinder, a pair of grinding rollers, one roller having circumferentially continuous ridges each with its outer edge formed with a circumferential series of teeth of less depth than the height of the ridge, and the other roller being provided with circumferentially discontinuous ridges in the form of substantially longitudinally arranged spaced series of teeth with the teeth elongated circumferentially, the teeth of each series being provided with an intermediate notch.

3. In a grinder, a pair of grinding rollers, one roller being provided with an axial series of circumferential continuous parallel ridges narrowed outwardly and formed into teeth, and the other roller having a like series of ridges made circumferentially discontinuous by a circular series of grooves in depth substantially the same as the height of the ridges and in width substantially the same as the circumferential extent of the ridges between adjacent grooves.

4. In a coffee grinder, grinding rollers one provided with a longitudinal series of circumferential ridges of substantially V-shape with the angle of the V outward and the outer edge of each ridge notched to form a continuous circumferential series of teeth of less depth than the height of the ridges, and the other roller being provided with substantially longitudinal series of teeth spaced apart circumferentially and each tooth elongated circumferentially and provided with an intermediate notch of less depth than the height of the tooth, each series of teeth having a longitudinal pitch approximately equal to the width of the space separating the series from the next adjacent series.

5. In a coffee grinder, a grinding roller formed with circumferentially arranged ridges of substantially V-shape in cross section, said ridges being arranged in equally spaced longitudinal series having a pitch with relation to the longitudinal axis of the roller substantially equal to the space separating one longitudinal series from the next adjacent one.

6. In a coffee grinder, a grinding roller of substantially cylindrical form having thereon a longitudinal series of closely related circumferential ridges each formed at its apex with a continuous series of notches defining short teeth of approximately pyramidal form, and another grinding roller having a longitudinal series of circumferential ridges divided by equally spaced longitudinally arranged grooves each of a width substantially that of the portion of the ridges included between two adjacent grooves, each ridge between two adjacent grooves being formed into teeth elongated circumferentially.

7. In a coffee grinder, a grinding roller formed with substantially equally spaced longitudinal series of circumferentially extended teeth of substantially V shape and each series of teeth being pitched with relation to the longitudinal axis of the roller to an extent substantially that of the space separating such series from the next adjacent series, each tooth being also provided with an intermediate notch of less depth than the height of the respective tooth.

8. In a coffee grinder, a suitable casing, a grinding roller journaled in said casing, another grinding roller having bearings in the casing elongated in a direction toward the bearings of the first roller, and an adjusting member in the casing in embracing relation to the first named roller and having bearings for the journals of the second named roller and provided with elongated recesses for the passage of the journals of the first named roller, said adjusting member being provided with manipulating means for moving said adjusting member and with it the second named roller toward and from the first named roller.

In testimony, that I claim the foregoing as my own, I have hereto affixed my signature in the presence of two witnesses.

WILLIAM A. McGUIRE.

Witnesses:
M. W. McDonald,
Edith Mulhollan.

Copies of this patent may be obtained for five cents each, by addressing the "Commissioner of Patents, Washington, D. C."